1,679,264

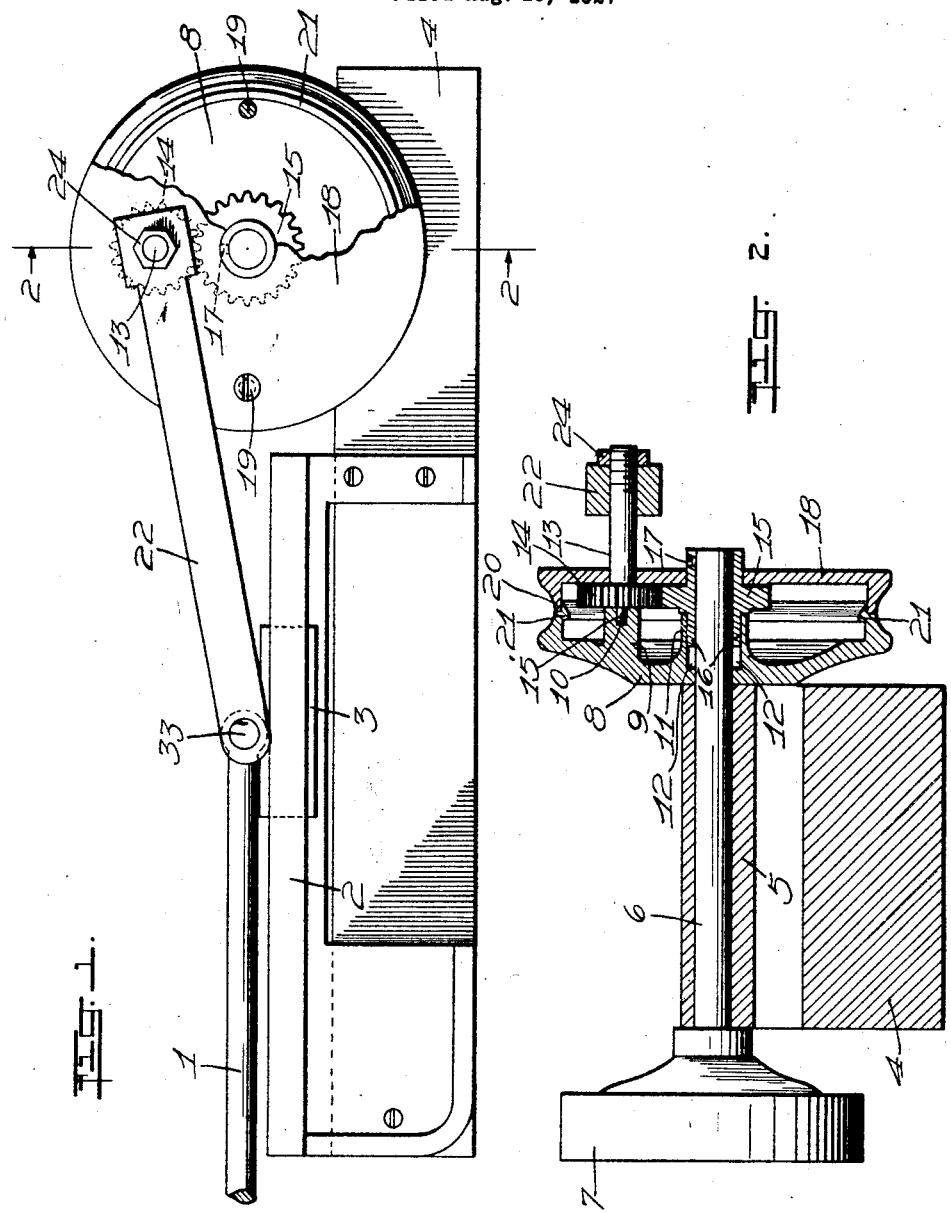
July 31, 1928.
R. C. PARKER
TRANSMISSION GEARING
Filed Aug. 13, 1927
1,679,264
INVENTOR
R. C. PARKER
BY
ATTORNEY Patented July 31, 1928.

UNITED STATES PATENT OFFICE.

ROBERT C. PARKER, OF LA PORTE, INDIANA, ASSIGNOR OF FORTY ONE-HUNDREDTHS TO WILBUR D. CRAM, OF LA PORTE, INDIANA.

TRANSMISSION GEARING.

Application filed August 13, 1927. Serial No. 212,677.

My invention relates to improvements in transmission gearings, and it consists in the combinations, constructions, and arrangements herein described and claimed.

An object of my invention is to provide a transmission gearing for increasing the speed of a driven shaft, while at the same time conserving a maximum of power.

A further object is to provide a transmission gearing in which the moving parts are enclosed in a substantially dust-proof casing, the casing itself serving as a part of the gearing.

A further object is to provide a gearing of the type described in which access may be readily had to the interior of the casing.

A further object is to provide a transmission gearing of compact form, which, owing to its protection in the casing, is adaptable for many uses where exposed gears would be subject to clogging from dust or dirt.

Other objects and advantages will appear in the following specification, and the novel features of the invention will be particularly pointed out in the appended claims.

My invention is illustrated in the accompanying drawings, forming part of this application, in which Figure 1 is a side view of the gearing (a portion being broken away) and a portion of a source of power, such as an engine, and Figure 2 is a section along the line 2—2 of Figure 1.

In carrying out my invention, I make use of any suitable source of power, such as a steam engine, gasoline engine, or turbine. In Figure 1, I have indicated a piston rod of such an engine at 1, a frame at 2, and a crosshead at 3.

Mounted on a base 4 is a bearing 5 and a transverse shaft 6. One end of this shaft is provided with a pulley 7. The opposite end has loosely mounted thereon a dish-shaped casing 8. The latter is provided with an inwardly projecting stub shaft 9. The stub shaft has at its inner end a recess 10. The casing member 8 is provided with an inwardly extending boss 11 and the latter has a bore 12 extending from one end.

A crank pin or arm 13 bears at one end a gear 14 which has a trunnion 15' arranged to enter the recess 10 in the stub shaft 9. The gear 14 is in mesh with a gear 15. The latter has an integral hub 16 which enters the recess 12 of the boss 11. On the opposite side, the hub is held by means of a set screw 17 to the shaft 6.

A casing member 18, which conforms to the contour of the casing member 8, is provided with a central opening to permit the passage of the hub 16, and another opening to permit the passage of the crank pin 13. The casing member 18 is secured to the casing member 8 by means of screws such as those shown at 19 in Figure 1. It will be observed that the casing member 19 has a flange 20 which is arranged to fit in a circumferential groove on the periphery of the flange 21 of the casing member 8.

A connecting rod 22 is pivotally secured at 33 to the crosshead 3. The opposite end of the connecting rod is threaded to screw onto the partially threaded end of the crank pin 13, while a nut 24 on the end of the crank pin holds the connecting rod in rigid connection to the crank pin.

From the foregoing description of the various parts of the device, the operation thereof may be readily understood. In assembling the device, the crank pin 13 is passed through the casing member 18 and then is secured to the connecting rod by turning the pin as far as it will go and then the nut 24 is drawn down tight. The gear 15 having been previously placed in position, the casing member 18 is fitted over the companion casing member 8, the trunnion 15' entering the recess, and the casing members are locked together by means of the screws, as described.

Now when the engine is started up, the casing member 8 will be caused to revolve through the medium of the crank pin 13 and will carry with it the casing member 18 and the gear 14. The latter will carry around with it the gear 15, but the rotation of the gear 15 will be faster than that of the casing. In other words, whenever there is a complete revolution of the connecting rod, the shaft 6 will revolve to a greater distance, thus the casing may make one revolution and the shaft 6 and consequently the pulley 7 may make a revolution and a half in the same time depending upon the diameter of the gears 14 and 15.

A device of this kind is less liable to become dead centered than in constructions in which speed reductions or increases are obtained by merely differences in gear sizes and where a straight crank action is used.

Furthermore, the protection of the parts by the casing gives a double function to the casing in that it forms a part of the driving mechanism, while at the same time it operates as a housing for protecting the gears from dust and dirt.

I claim:

1. A transmission gearing comprising a driven shaft, a casing member mounted on said shaft and revolvable with respect thereto, a stub shaft carried by the revolvable casing member and provided with a bore, a gear fixedly secured to said shaft, a second gear in mesh with said first gear, a crank pin rigidly secured to said second gear on one side thereof, a trunnion secured to said second-named gear on the opposite side thereof and arranged to enter the bore in said stub shaft, a second casing member secured to said first-named casing member for enclosing said gears, said second-named casing member being provided with an opening for the passage of the crank pin, and a connecting rod rigidly secured to said crank pin on the exterior of the casing.

2. A transmission gearing comprising a driven shaft, a casing member mounted on said shaft and revolvable with respect thereto, a stub shaft carried by the revolvable casing member and provided with a bore, a gear fixedly secured to said shaft, a second gear in mesh with said first gear, a crank pin rigidly secured to said second gear on one side thereof, a trunnion secured to said second-named gear on the opposite side thereof and arranged to enter the bore in said stub shaft, and a second casing member secured to said first-named casing member for enclosing said gears.

3. A transmission gearing comprising a driven shaft, a casing member mounted on said shaft and revolvable with respect thereto, a stub shaft carried by the revolvable casing member and provided with a bore, a gear fixedly secured to said shaft, a second gear in mesh with said first gear, a crank pin rigidly secured to said second gear on one side thereof, and a trunnion secured to said second-named gear on the opposite side thereof and arranged to enter the bore in said stub shaft.

4. A transmission gearing comprising a driven shaft, housing means mounted on said driven shaft and rotatable with respect thereto, a gear fixed to said driven shaft, a second gear carried by said housing means, said housing means being rotatable with respect to said second gear, said second gear being disposed in operative relation with said first named gear, a crank pin carried by said second gear, and a connecting rod for actuating the crank pin.

5. A transmission gearing comprising a driven shaft, housing means mounted on said driven shaft and rotatable with respect thereto, a gear fixed to said driven shaft, a second gear carried by said housing means, said housing means being rotatable with respect to said second gear, said second gear being disposed in operative relation with said first named gear, and means connected with the second gear for actuating the latter.

ROBERT C. PARKER.